US012596293B2

(12) United States Patent
Yan et al.

(10) Patent No.: US 12,596,293 B2
(45) Date of Patent: Apr. 7, 2026

(54) LIGHT ADJUSTMENT DEVICE AND PHOTOGRAPHY AUXILIARY DEVICE

(71) Applicant: Shenzhen Leqi Innovation Co., Ltd., Shenzhen (CN)

(72) Inventors: Keman Yan, Shenzhen (CN); Xing Ye, Shenzhen (CN)

(73) Assignee: SHENZHEN LEQI INNOVATION CO., LTD., Shenzhen (CN)

( * ) Notice: Subject to any disclaimer, the term of this patent is extended or adjusted under 35 U.S.C. 154(b) by 0 days.

(21) Appl. No.: 19/031,015

(22) Filed: Jan. 17, 2025

(65) Prior Publication Data

US 2025/0164857 A1 May 22, 2025

Related U.S. Application Data

(63) Continuation of application No. PCT/CN2023/123927, filed on Oct. 11, 2023.

(30) Foreign Application Priority Data

Dec. 7, 2022 (CN) .......................... 202223277761.0

(51) Int. Cl.
| | |
|---|---|
| *G03B 15/03* | (2021.01) |
| *G02B 7/04* | (2021.01) |
| *G03B 13/32* | (2021.01) |
| *G03B 15/05* | (2021.01) |
| *G03B 17/12* | (2021.01) |

(52) U.S. Cl.
CPC .............. *G03B 15/03* (2013.01); *G02B 7/04* (2013.01); *G03B 13/32* (2013.01); *G03B 15/05* (2013.01); *G03B 17/12* (2013.01)

(58) Field of Classification Search
CPC ........ G02B 7/04; G03B 13/032; G03B 15/03; G03B 15/05; G03B 17/12
See application file for complete search history.

(56) References Cited

U.S. PATENT DOCUMENTS

| | | | | |
|---|---|---|---|---|
| 2007/0086093 A1* | 4/2007 | Hung | ....................... | G02B 7/04 |
| | | | | 359/676 |
| 2010/0103543 A1* | 4/2010 | Takahashi | .............. | G02B 7/023 |
| | | | | 359/825 |

FOREIGN PATENT DOCUMENTS

| | | |
|---|---|---|
| CN | 108317483 A | 7/2018 |
| CN | 114236739 Y | 3/2022 |
| CN | 216595688 U | 5/2022 |

OTHER PUBLICATIONS

Written Opinion of PCT/CN2023/123927, Jul. 2022 (Year: 2022).*
International Search Report of PCT Patent Application No. PCT/CN2023/123927 issued on Dec. 29, 2023.

* cited by examiner

*Primary Examiner* — Keith G. Delahoussaye
(74) *Attorney, Agent, or Firm* — Andrew C. Cheng

(57) ABSTRACT

A light adjustment device includes a lens head and a lens tube disposed around the lens head and slidable relative to the lens head in a first direction. A rotating assembly is rotatably mounted on one of the lens tube and the lens head. The rotating assembly is drivingly connected with the other of the lens tube and the lens head through a transmission structure, at least a portion of the transmission structure is rotatable with the rotation of the rotating assembly, the transmission structure is configured to convert a rotational output of the rotating assembly into a linear output of the other of the lens tube and the lens head, so that the lens tube is capable of reciprocating linearly in the first direction relative to the lens head under the action of the linear output.

19 Claims, 15 Drawing Sheets

First Direction

First Direction

LIGHT ADJUSTMENT DEVICE AND PHOTOGRAPHY AUXILIARY DEVICE

FIELD

This disclosure relates to the technical field of aided photography, in particular to a light adjustment device and a photography auxiliary device.

BACKGROUND

To gain better photographing experience, photography auxiliary devices are often used. For example, a light adjustment device may be used to adjust the focus of the light to obtain a desired lighting condition. However, existing light adjustment devices, when used for adjusting the focus, can get stuck easily because of their unreasonable structural design, thus being poor in operating reliability.

SUMMARY

The disclosure is directed to a light adjustment device and a photography auxiliary device, which can adjust the focus easily and smoothly and avoid getting stuck during focus adjustment, thereby ensuring the operating stability of the light adjustment device.

In one aspect, a light adjustment device includes a lens head and a lens tube, wherein the lens head is configured to mount a lens, and the lens tube and lens head are disposed with one sleeving around the other, and the lens tube is slidable with respect to the lens head in a first direction. A rotating assembly is rotatably mounted on one of the lens tube and the lens head, a push component is arranged on the rotating assembly and rotatable with rotation of the rotating assembly, a sliding groove corresponding to the push component is formed in the other one of the lens tube and the lens head, an included angle is formed between an extension direction of the sliding groove and the first direction, and the push component extends into the sliding groove, such that when the rotating assembly rotates, the push component rotates synchronously to press a wall of the sliding groove to allow the lens tube to reciprocate linearly with respect to the lens head in the first direction.

In some embodiments, the lens tube is disposed around the lens head, and a mounting groove is formed in a wall of the lens tube. The rotating assembly comprises a driving gear and a driven gear assembly meshing with the driving gear, the driving gear and the driven gear assembly are mounted in the mounting groove and are rotatable in the mounting groove, the driving gear is connected to an outside of the lens tube, the push component is arranged on the driven gear assembly, and at least a portion of the push component is located outside the mounting groove and extends into the sliding groove.

In some embodiments, the driven gear assembly comprises a transmission gear and a driven gear, the transmission gear meshes with the driving gear and the driven gear, and the push component is arranged on the driven gear.

In some embodiments, the driven gear comprises internal teeth, a receiving area is defined and enclosed by the internal teeth, the driving gear and the transmission gear are located in the receiving area, the driving gear meshes with the transmission gear by mean of external teeth, and the transmission gear meshes with the internal teeth of the driven gear.

In some embodiments, a limit through-hole is formed in a bottom of the mounting groove and extends through the wall of the lens tube. The driven gear is mounted at the bottom of the mounting groove and is rotatable around an axial direction of the mounting groove, a limit protrusion is arranged at a bottom of the driven gear and inserted into the limit through-hole, and the push component extends beyond the limit protrusion and extends through the limit through-hole into the sliding groove; the driving gear and the transmission gear are located on a side, facing away from the limit protrusion, of the driven gear.

In some embodiments, the mounting groove comprises a first groove section, a second groove section and a third groove section which are sequentially arranged in a circumferential direction of the lens tube, and the second groove section is connected to the first groove section and the third groove section. The driving gear is rotatably mounted in the first groove section, the transmission gear is rotatably mounted in the second groove section, and the driven gear is rotatably mounted in the third groove section.

In some embodiments, the light adjustment device comprises two such second groove sections and two such third groove sections, the two second groove sections are located on two sides of the first groove section respectively, each of the two second groove sections is provided with the transmission gear, the two third groove sections are located on two sides of the first groove section respectively, each of the two third groove sections is provided therein with the driven gear, each of the two driven gears is provided thereon with the push component, and the lens head is provided with the sliding groove at a location corresponding to each of the two push components.

In some embodiments, the rotating assembly further comprises a rotary knob, at least a portion of the rotary knob protrudes beyond a surface of the lens tube, and the rotary knob is connected to the driving gear, such that the driving gear will rotate synchronously when the rotary knob is rotated; and/or, the light adjustment device further comprises a cover plate, the cover plate covers an opening of the mounting groove, and a through-hole is formed in a position, corresponding to the driving gear, of the cover plate to expose the driving gear.

In some embodiments, a limit groove is formed in one of the lens tube and the lens head, a limit rib is arranged on the other one of the lens tube and the lens head, the limit rib and the limit groove extend in the first direction, and the limit rib is fit into the limit groove.

In some embodiments, the lens tube and the lens head are relatively fixed in a circumferential direction, the transmission structure comprises a first transmission member and a second transmission member threadedly engaged with each other, the first transmission member is configured to rotate following the rotation of the rotating assembly, and the second transmission member is relatively fixed to the other of the lens tube and the lens head.

In some embodiments, the lens tube is attached around the lens head, the rotating assembly and the first transmission member are rotationally mounted on the lens tube respectively, the first transmission member is attached around the lens head, the first transmission member is provided with a helical groove on an inner side of the first transmission member, and the second transmission member is fixed relative to the lens head and is provided with a helical tooth protruding from an outer side of the second transmission member, and the helical tooth and the helical groove engage with each other to form a threaded fit between the first transmission member and the second transmission member.

In some embodiments, there are a plurality of the second transmission members, each of the second transmission members being provided with the helical tooth and respectively engaging with the helical groove, and the plurality of the second transmission members being spaced apart and arranged in a circumferential direction of the lens head.

In some embodiments, the lens head is provided with a mounting slot, and the second transmission member is fixedly mounted in the mounting slot.

In some embodiments, the mounting slot is provided with a positioning pin, the second transmission member is provided with a positioning hole, and the positioning pin is inserted into the positioning hole.

In some embodiments, the second transmission member is mounted on one end of the lens head in the first direction, and in the first direction, one end of the helical groove extends to an end face of the first transmission member to form an opening, for the helical tooth on the second transmission member to enter the helical groove through the opening.

In some embodiments, the rotating assembly is provided with a first gear, the first transmission member is provided with a second gear on an outer side of the first transmission member, the first gear and the second gear engage with each other, and an axis of rotation of the first gear being perpendicular to an axis of rotation of the second gear.

In some embodiments, the first transmission member comprises a cylindrical body, and the second gear is attached around a circumferential outer side of the cylindrical body.

In some embodiments, an annular flange is provided around the outer side of the cylindrical body, and the second gear is provided on a side of the annular flange facing the first gear.

In another aspect, a photography auxiliary device includes a light source and the light adjustment device as described above. The light source is arranged in the lens tube of the light adjustment device.

In the above embodiments, with the provision of the transmission structure, a rotational output of the rotating assembly is converted into a linear output of the other of the lens tube and the lens head, so as to enable the lens tube to reciprocate linearly with respect to the lens head in the first direction to adjust the focus. Because the lens tube makes a translational movement with respect to the lens head, the light adjustment device can operate smoothly and will not get stuck, thus improving the operating stability of the light adjustment device. Because only a component of the press force applied to the sliding groove by the push component is in the first direction, the lens tube will not move too fast with respect to the lens head, thus improving the focusing accuracy of the light adjustment device.

BRIEF DESCRIPTION OF THE DRAWINGS

To better clarify the technical solutions in the embodiments of the invention or the prior art, drawings used for describing the embodiments of the invention or the prior art will be briefly introduced below. Obviously, the drawings in the following description merely illustrate some embodiments of the invention, and those ordinarily skilled in the art can obtain other drawings according to the following ones without creative labor.

REFERENCE NUMERALS

Figure 1:
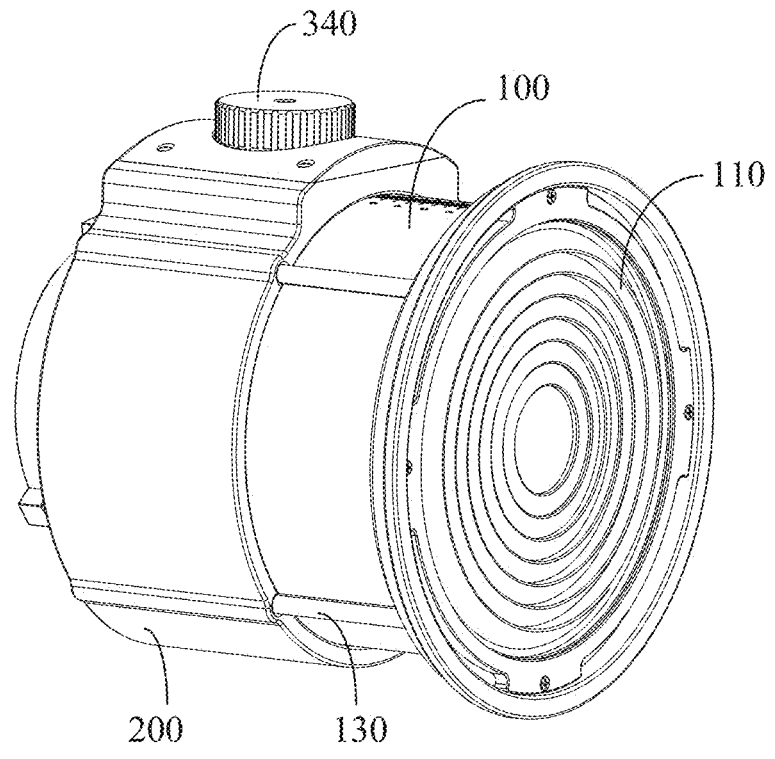
FIG. 1 is a perspective view of a first embodiment of a light adjustment device.
Figure 2:
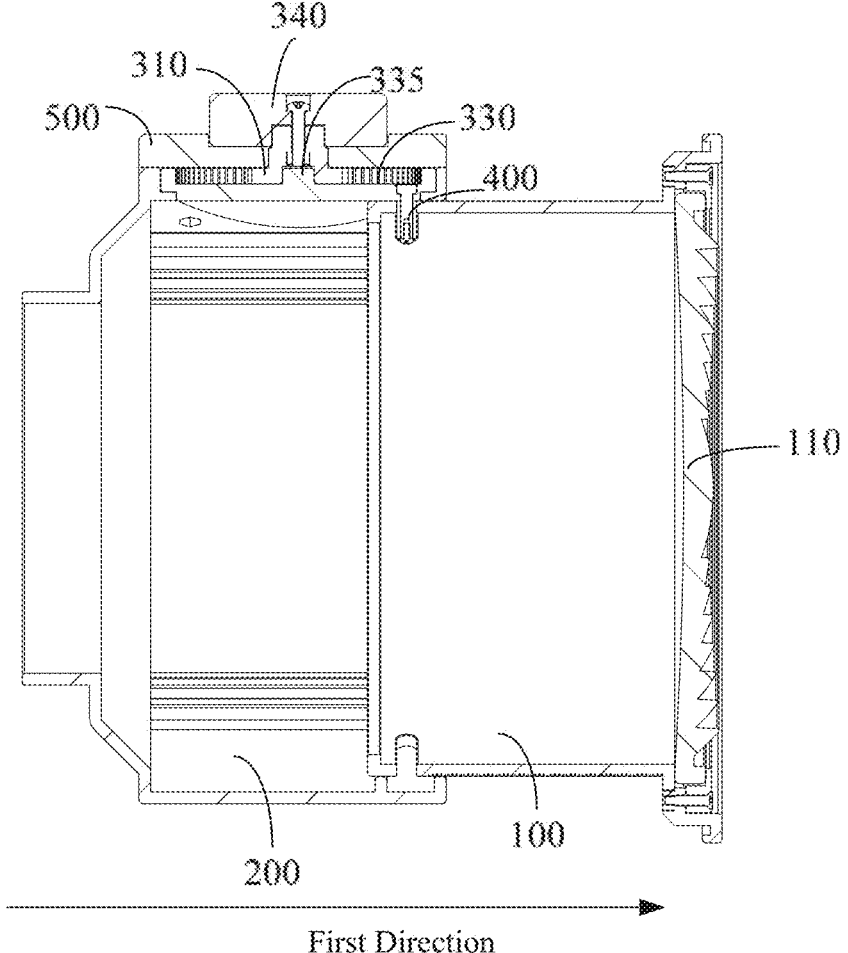
FIG. 2 is a sectional view of the first embodiment of the light adjustment device.
Figure 3:
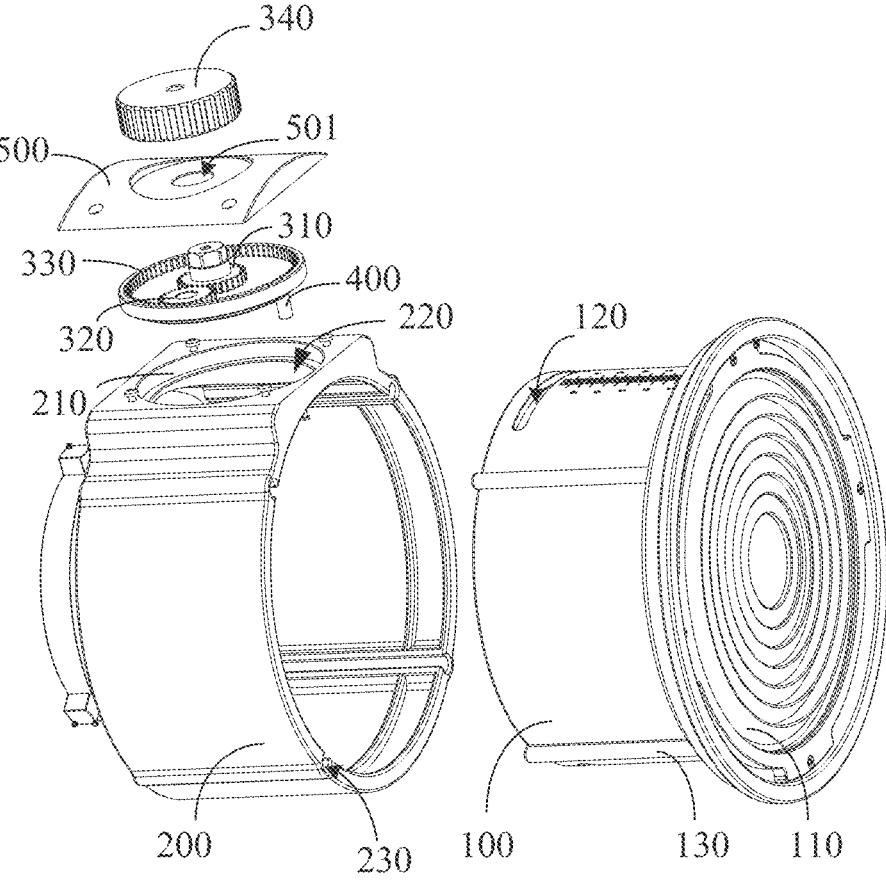
FIG. 3 is an exploded view of the first embodiment of the light adjustment device.
Figure 4:
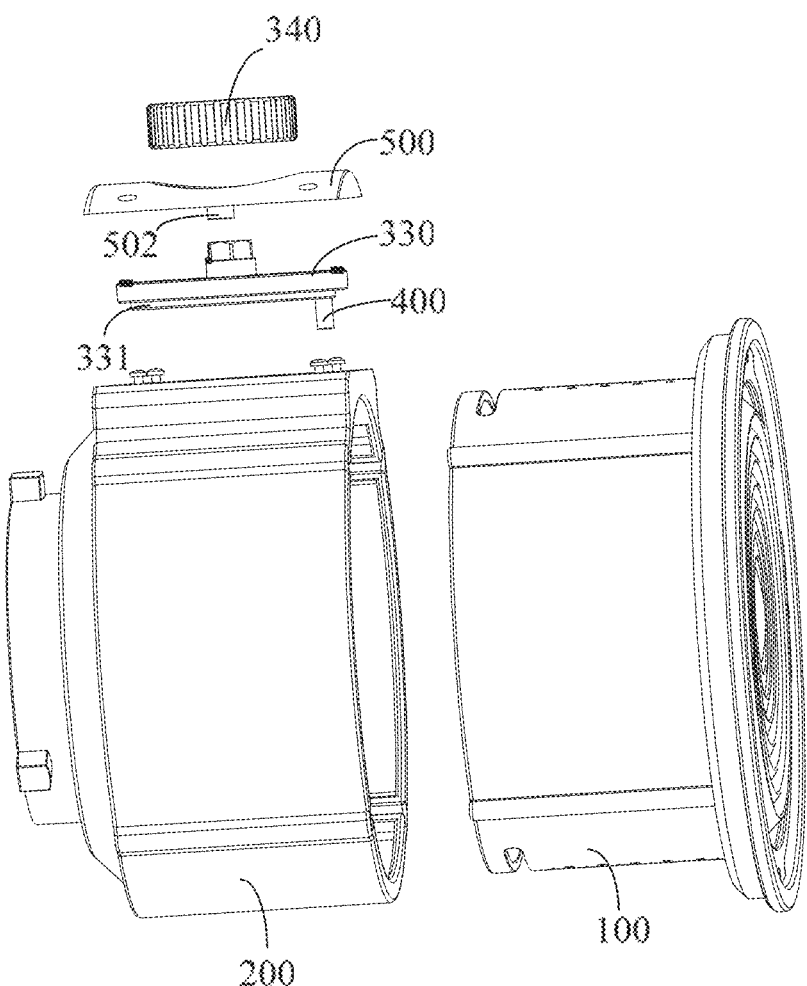
FIG. 4 is an exploded view of the first embodiment of the light adjustment device, viewed from another perspective.
Figure 5:
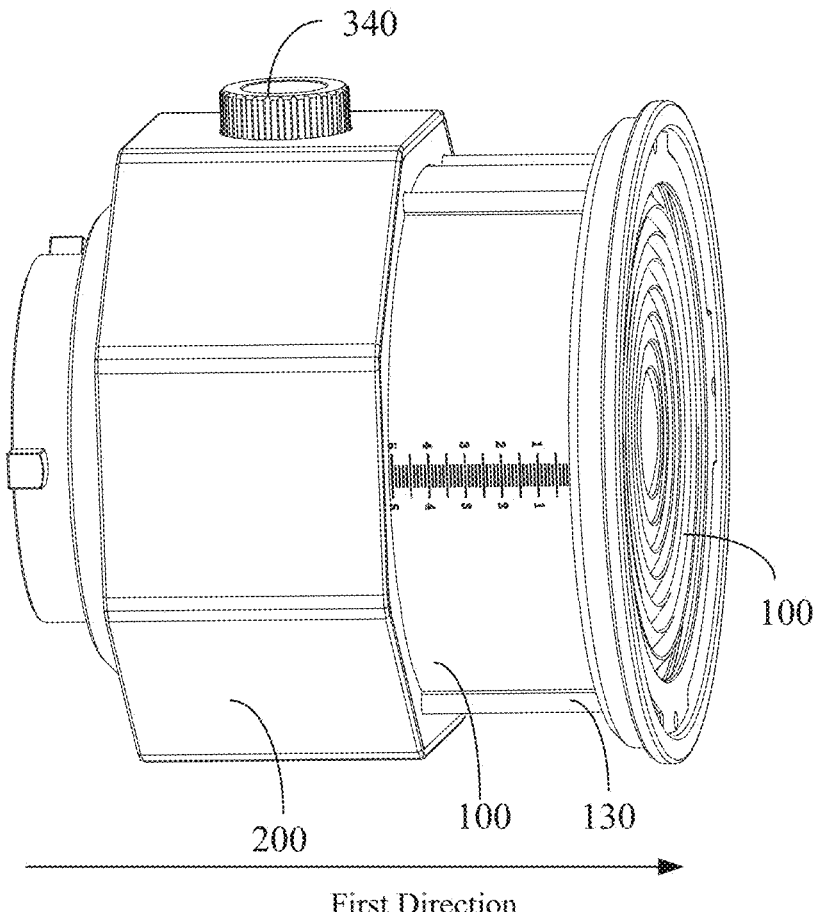
FIG. 5 is a perspective view of a second embodiment of the light adjustment device.
Figure 6:
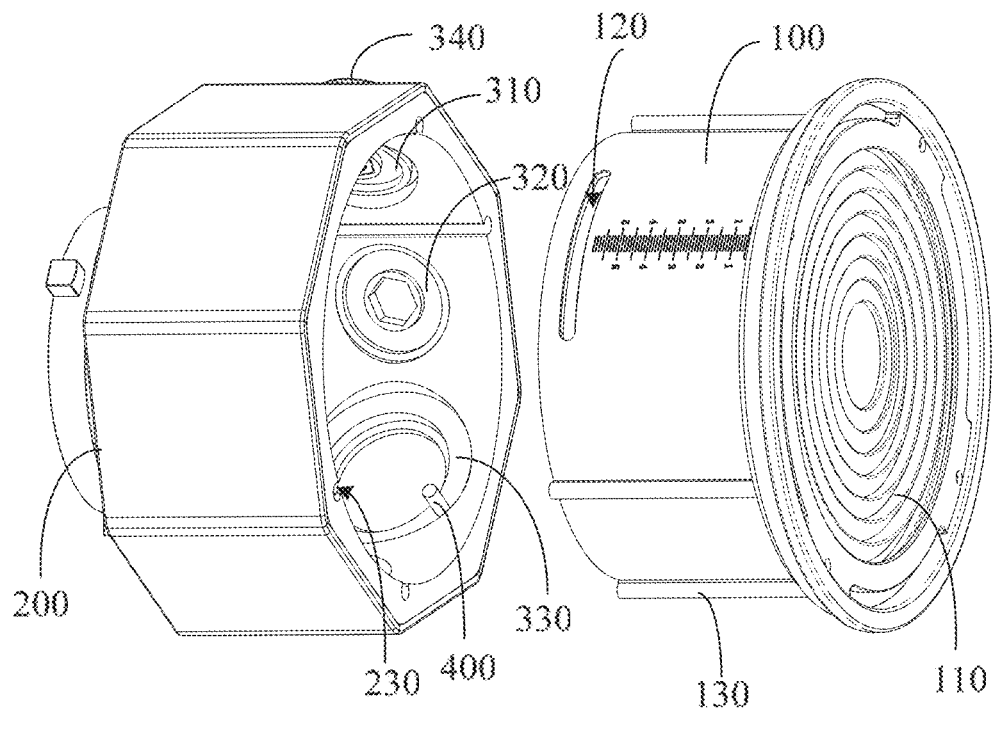
FIG. 6 is an exploded view of the second embodiment of the light adjustment device.
Figure 7:
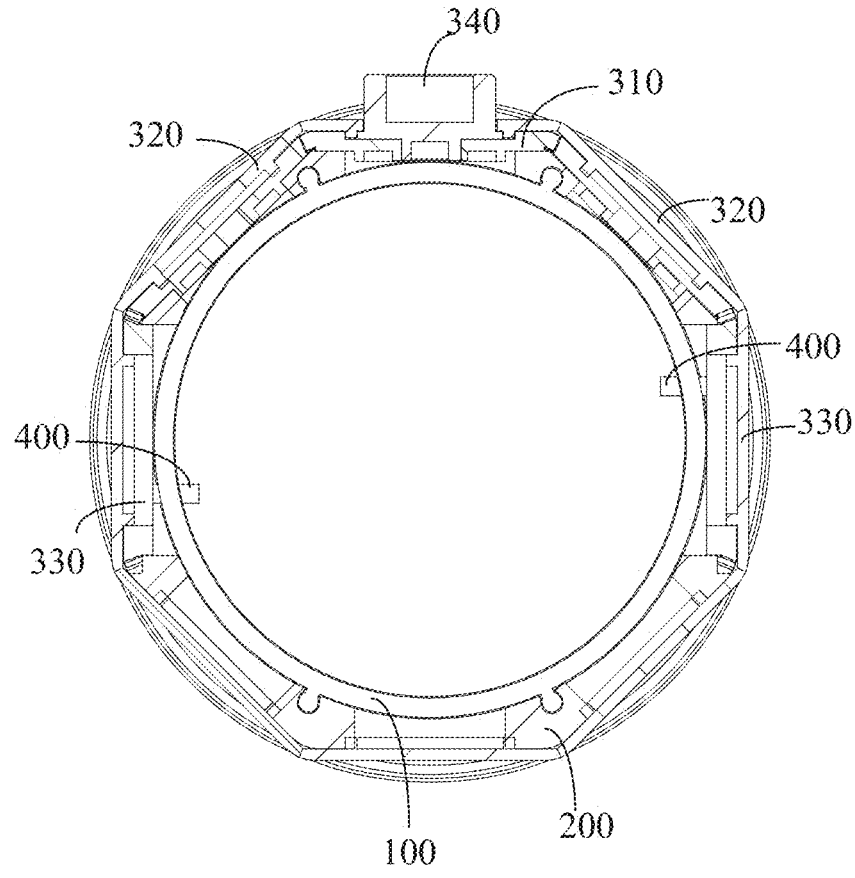
FIG. 7 is a sectional view of the second embodiment of the light adjustment device.
Figure 8:
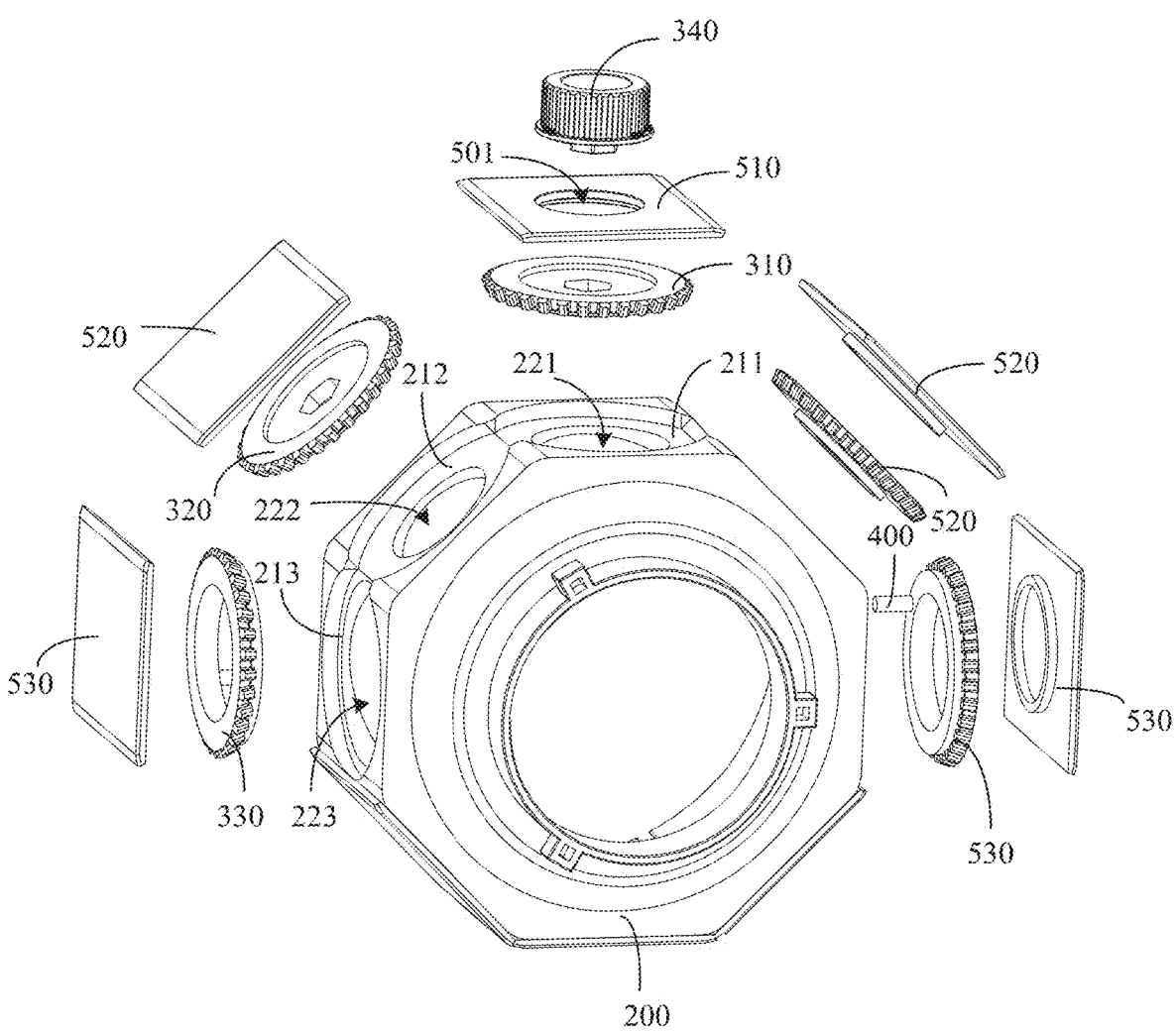
FIG. 8 is a partially exploded view of the second embodiment of the light adjustment device.
Figure 9:
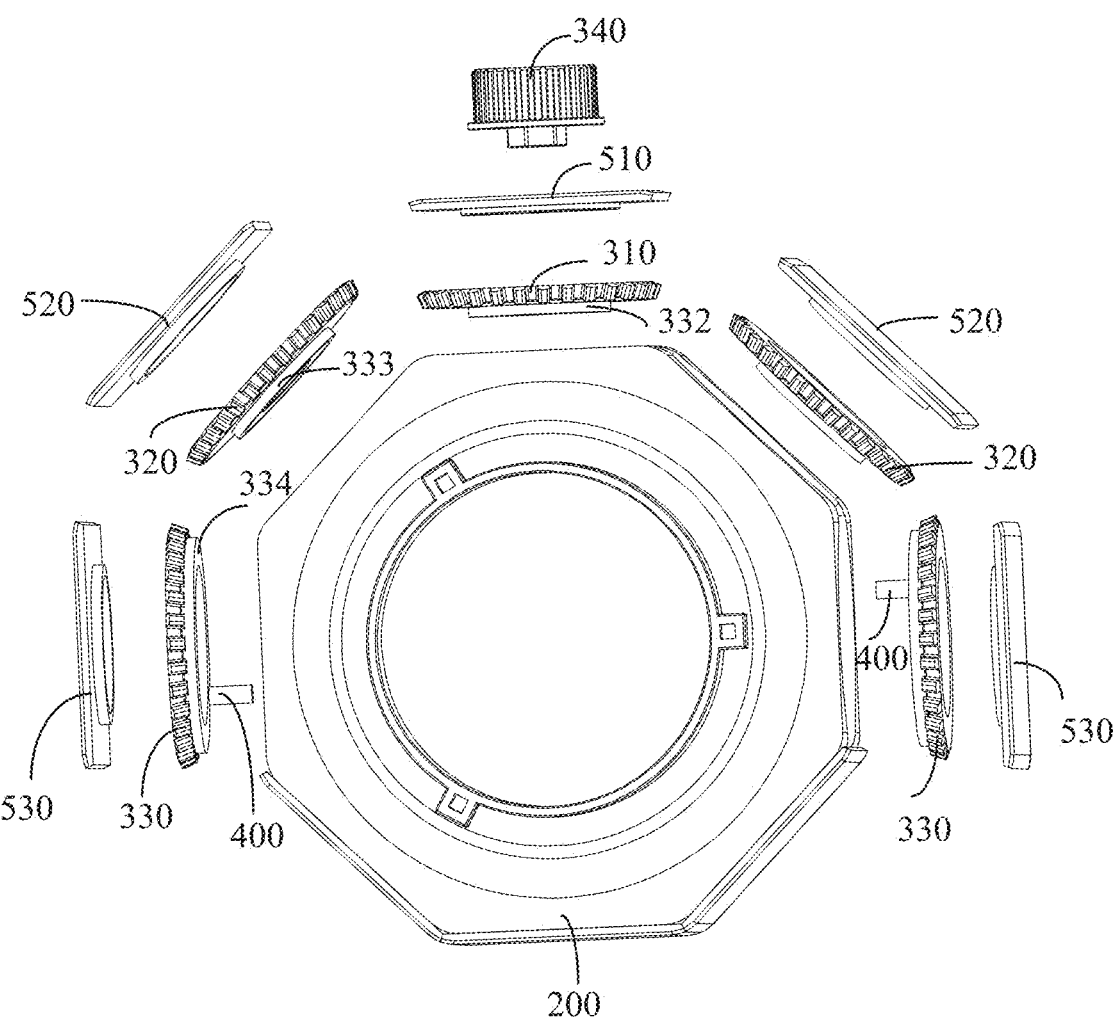
FIG. 9 is a partially exploded view of the second embodiment of the light adjustment device, viewed from another perspective.
Figure 10:
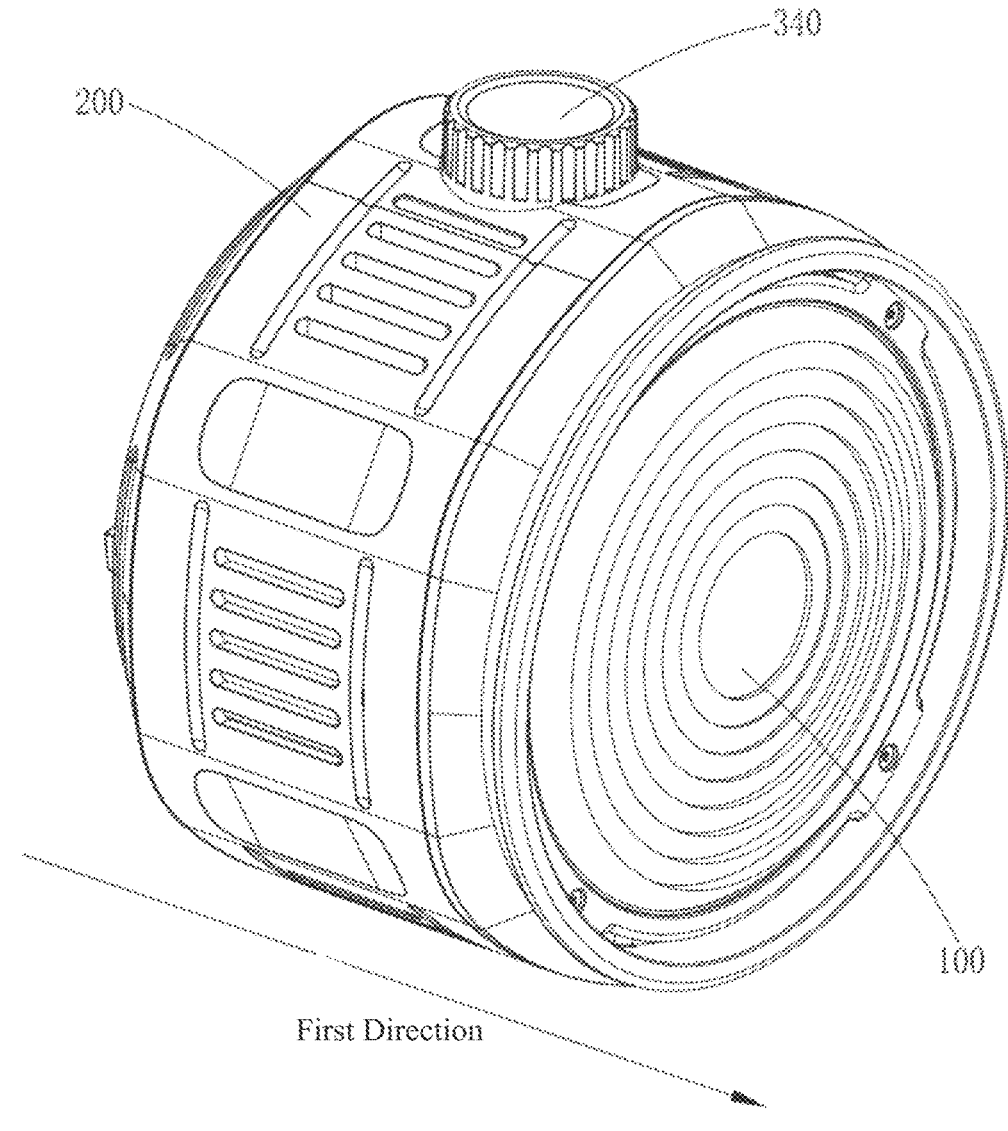
FIG. 10 shows a schematic diagram of the structure of another embodiment of the light adjustment device.
Figure 11:
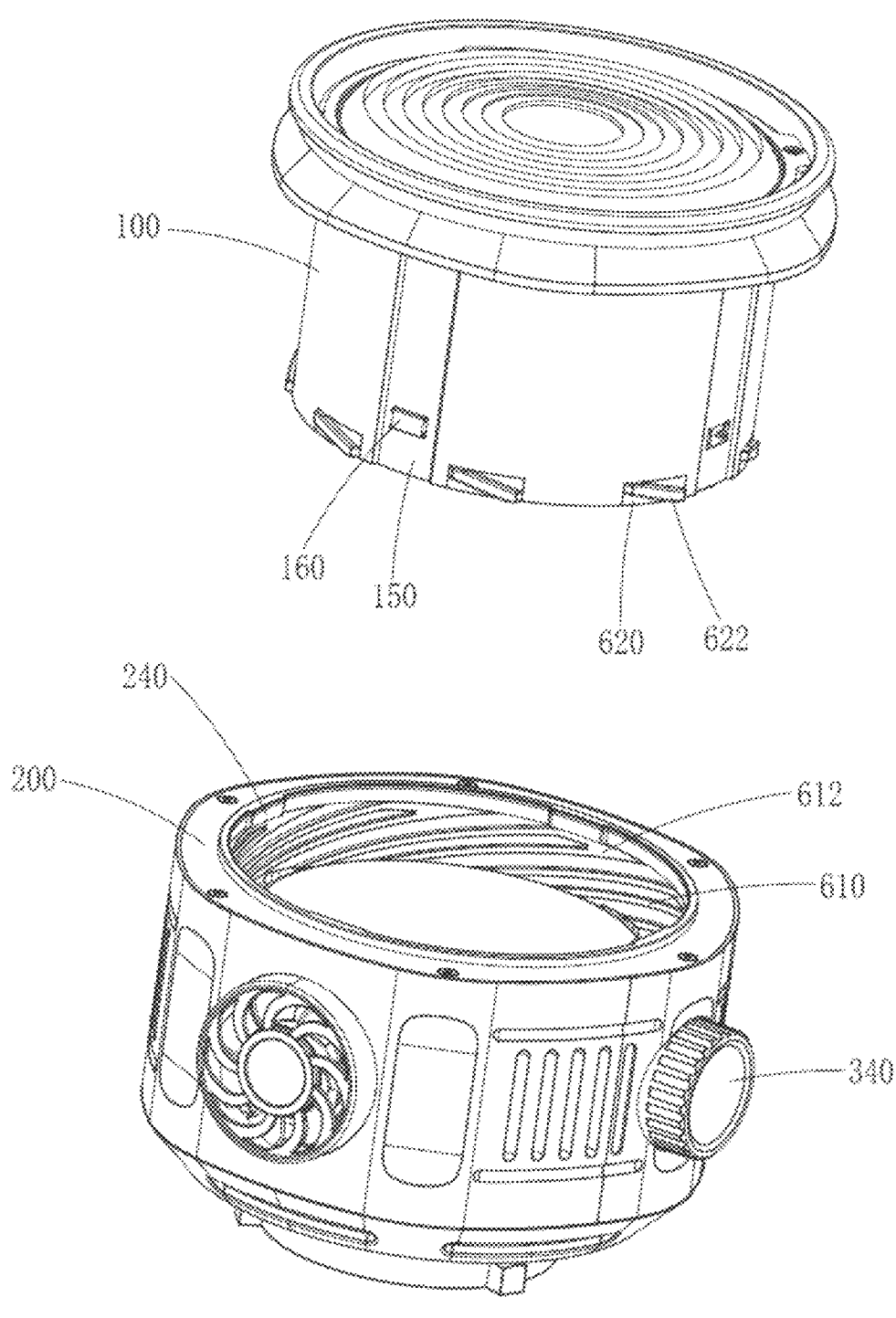
FIG. 11 is an exploded view of the light adjustment device shown in FIG. 10.
Figure 12:
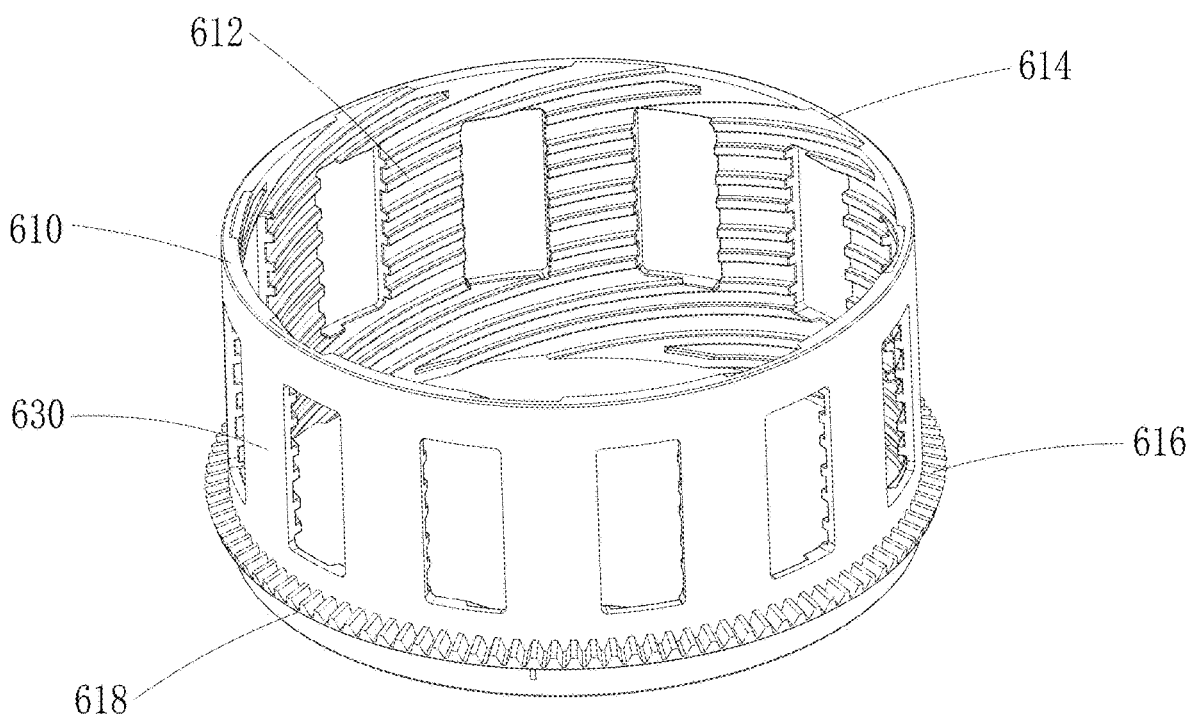
FIG. 12 is an exploded view showing the lens head, a first transmission member, and a second transmission member.
Figure 12:
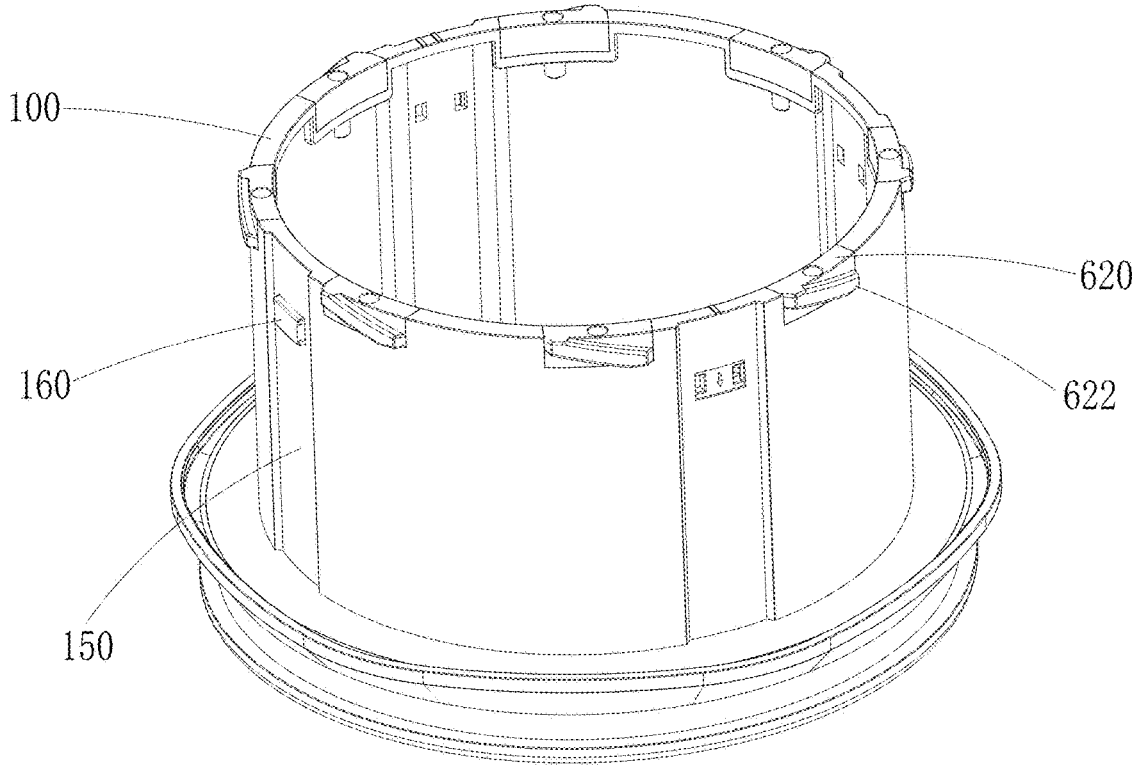
Figure 13:
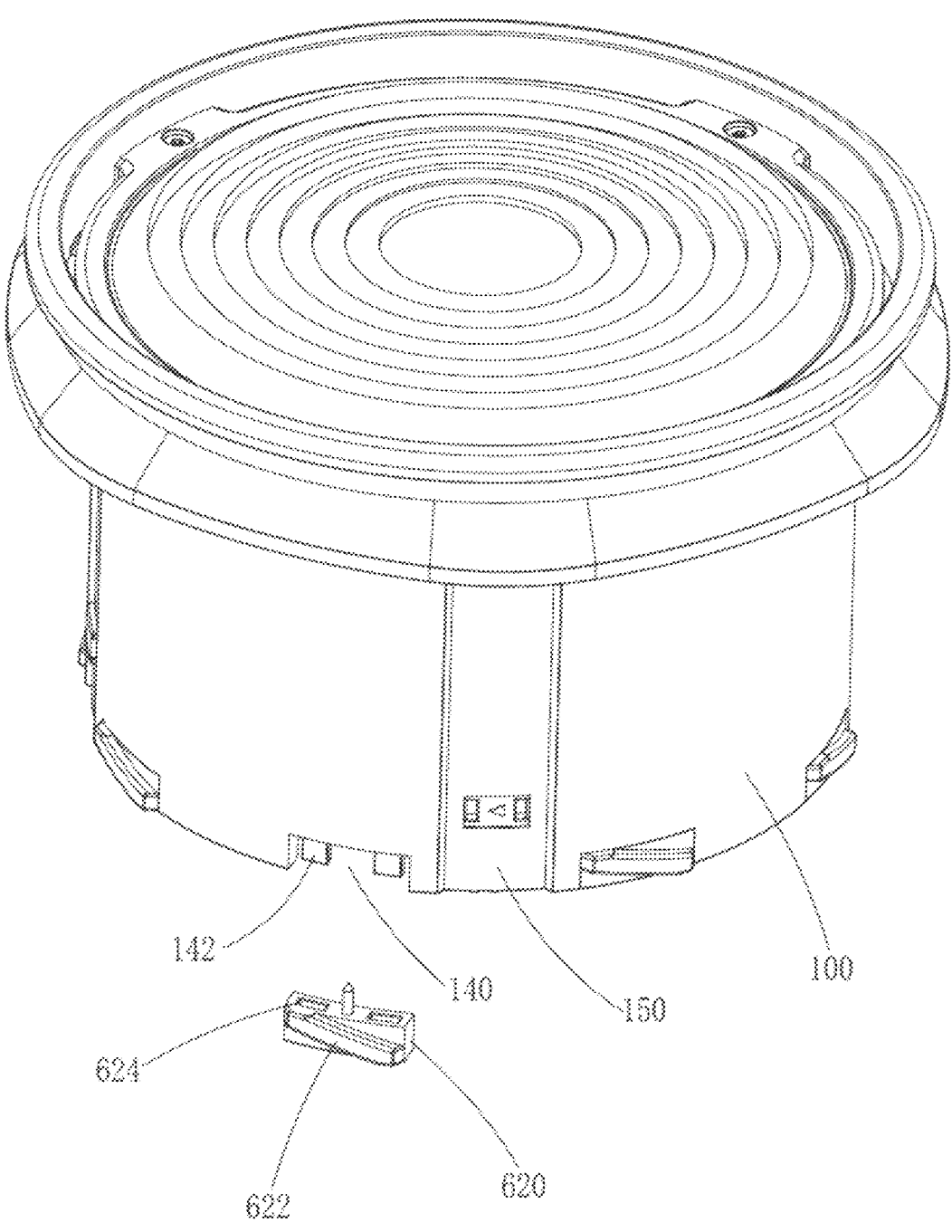
FIG. 13 is an exploded view showing the lens head and one second transmission member shown in FIG. 12.
Figure 14:
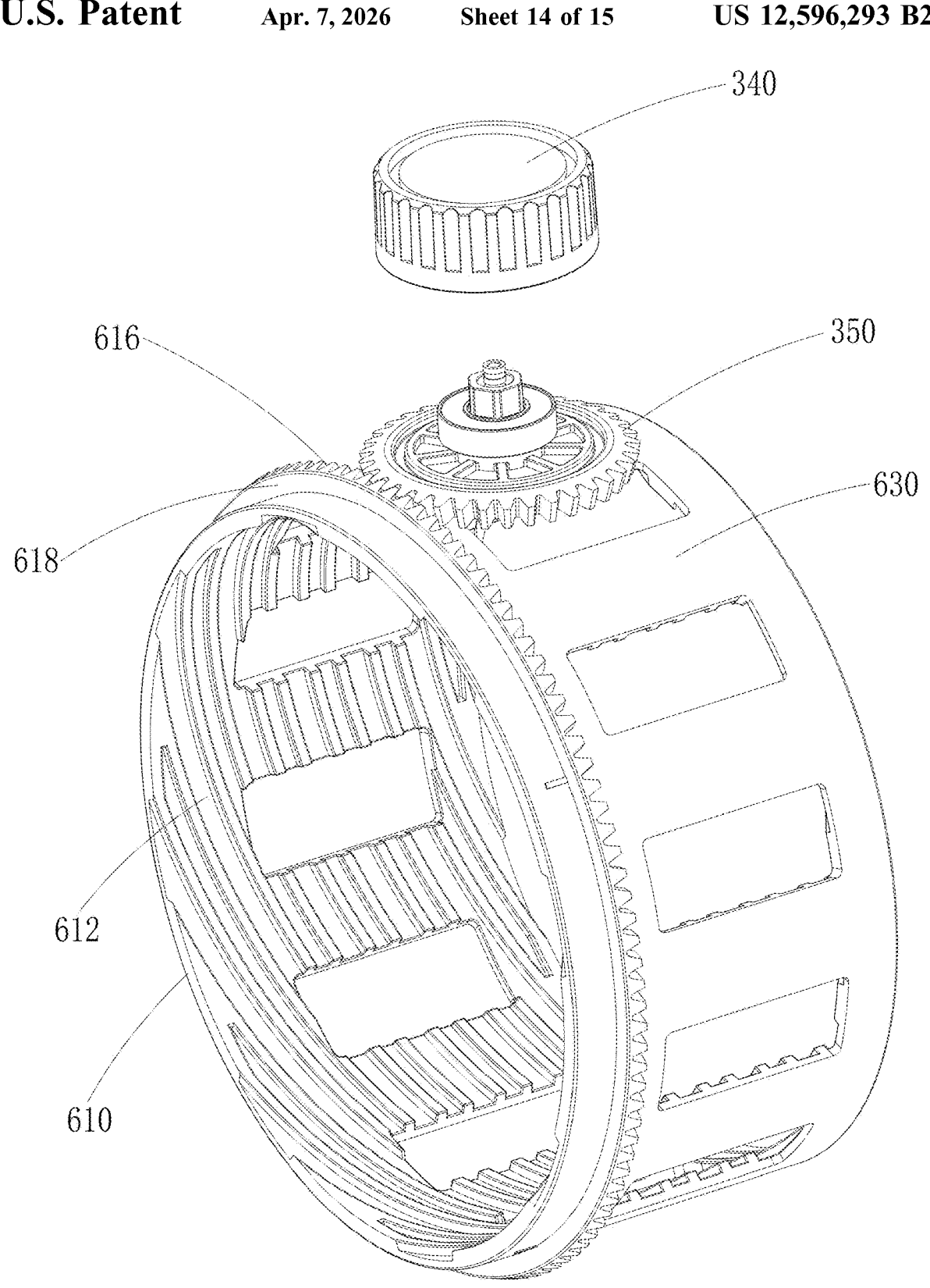
FIG. 14 is an exploded view showing the rotatory assembly and the first transmission member shown in FIG. 12.

| Reference numerals | Name | Reference numerals | Name |
| --- | --- | --- | --- |
| 100 | Lens head | 110 | Lens |
| 120 | Sliding groove | 130 | Limit rib |
| 200 | Lens tube | 210 | Mounting groove |
| 211 | First groove section | 212 | Second groove section |
| 213 | Third groove section | 220 | Limit through-hole |
| 221 | First limit through-hole | 222 | Second limit through-hole |
| 223 | Third limit through-hole | 230 | Limit groove |
| 310 | Driving gear | 320 | Transmission gear |
| 330 | Driven gear | 331 | Limit protrusion |
| 332 | First limit protrusion | 333 | Second limit protrusion |
| 334 | Third limit protrusion | 335 | First limit projection |
| 340 | Rotary knob | 400 | Push component |
| 500 | Cover plate | 501 | Through-hole |
| 502 | Second limit projection | 510 | First cover body |
| 520 | Second cover body | 530 | Thrid cover body |
| 610 | First transmission member | 620 | Second transmission member |
| 612 | Helical groove | 622 | Helical tooth |
| 140 | Mounting slot | 142 | Positioning pin |
| 624 | Positioning hole | 350 | First gear |
| 616 | Second gear | 618 | Flange |
| 630 | Cylindrical body | 150 | Recess |
| 240 | Bump | 160 | Stopper |
| 700 | Light source | | |

The fulfilment of the objectives of the disclosure and the functional features and advantages of the disclosure will be further described below in conjunction with embodiments.

DESCRIPTION OF THE EMBODIMENTS

The technical solutions in the embodiments of the disclosure will be clearly and completely described below in conjunction with accompanying drawings of these embodiments. Obviously, the embodiments in the following description are merely illustrative ones and are not all possible ones of the invention. All other embodiments obtained by those ordinarily skilled in the art according to the following ones without creative labor should also fall within the protection scope of the invention.

It should be noted that all directional indications (such as "upper", "lower", "left", "right", "front" and "back") in the embodiments of the disclosure are merely used to explain relative positional relations and motions between components in a specific attitude (as shown below), and once the specific attitude changes, these directional indications will change accordingly.

In addition, terms such as "first" and "second" involved in the description are merely used for the purpose of description and should not be construed as indicating or implying relative importance or implicitly indicating the number of technical features referred to. Therefore, a feature defined by "first" or "second" may explicitly or implicitly indicate the inclusion of at least one the feature. Moreover, "and/or" in the whole description includes three schemes, for example, A and/or B includes a technical scheme A, a technical scheme B, and a technical scheme combining A and B. Furthermore, the technical solutions in different embodiments may be combined as long as the combinations can be implemented by those ordinarily skilled in the art. If a combination of the technical solutions leads to a contradiction or cannot be implemented, this combination should be construed as non-existent and should not fall within the protection scope of the invention.

The specific structure of a light adjustment device is described below.

Referring to FIGS. 1-9, in one embodiment, the light adjustment device comprises a lens head 100 and a lens tube 200, wherein the lens head 100 is configured to mount a lens 110, and the lens tube 200 and lens head 100 are disposed with one sleeving around the other, and the lens tube 200 is slidable with respect to the lens head 100 in a first direction. A rotating assembly is rotatably mounted on one of the lens tube 200 and the lens head 100. The rotating assembly is drivingly connected to the other of the lens tube 200 and the lens head 100 via a transmission structure. At least a portion of the transmission structure rotates with the rotation of the rotating assembly. The transmission structure is constructed to convert the rotational output of the rotating assembly into a linear input of the other of the lens tube 200 and the lens head 100, and the lens tube 200 can reciprocate linearly in a first direction relative to the lens head 100 under the action of the linear input. Focus adjustment is achieved by controlling the direction of rotation of the rotating assembly to control the direction in which the lens tube 200 moves relative to the lens head 100. By providing the transmission structure to convert the rotary output into the linear input, the relative translational movement of the lens tube 200 and the lens head 100 is realized, which is smooth in operation and not easy to be jammed, and improves the reliability of the operation of the light adjustment device.

In the embodiment illustrated in FIG. 1 to FIG. 9, the transmission structure includes a push component 400 and a sliding groove 120. The push component 400 is protrusively arranged on the rotating assembly and rotates with rotation of the rotating assembly. The sliding groove 120 is formed in the other one of the lens tube 200 and the lens head 100, corresponding to the push component 400. An included angle is formed between an extension direction of the sliding groove 120 and the first direction, and the push component 400 stretches into the sliding groove 120, such that when the rotating assembly rotates, the push component 400 rotates synchronously to press a wall of the sliding groove 120 to allow the lens tube 200 to reciprocate linearly with respect to the lens head 100 in the first direction.

In this embodiment, the first direction may be construed as a length direction of the lens tube 200, for example, the first direction may be an axial direction of the lens tube 200. Regarding the included angle formed between the extension direction of the sliding groove 120 and the first direction, the extension direction of the sliding groove 120 may for example be a circumferential direction of the lens tube 200 or the lens head 100. The extension direction of the sliding groove 120 is different from a rotation direction of the rotating assembly, for example, the rotating assembly rotates about a second direction which is perpendicular to the first direction, such that when the rotating assembly rotates, the push component will rotate synchronously to press the wall of the sliding groove. It should be noted that the examples here are merely for description and are not intended to limit the directions.

Because an included angle is formed between the extension direction of the sliding groove 120 and the first direction, when the push component 400 is driven by the rotating assembly to rotate to press the wall of the sliding groove 120, the press force will have a force component in the first direction to drive the lens tube 200 to slide with respect to the lens head 100 in the first direction. The movement direction of the lens tube 200 with respect to the lens head 100 can be controlled by controlling the rotation direction of the rotating assembly, so as to allow the lens tube 200 to reciprocate linearly with respect to the lens head 100 in the first direction to adjust the focus. Because the lens tube 200 makes a translational movement with respect to the lens head 100, the light adjustment device can operate smoothly and will not get stuck, thus improving the operating stability of the light adjustment device; because only a component of the press force applied to the sliding groove 120 by the push component 400 is in the first direction, the lens tube 200 will not move too fast with respect to the lens head 100, thus improving the focusing accuracy of the light adjustment device.

In actual application, one or more limit grooves 230 are formed in one of the lens tube 200 and the lens head 100, one or more limit ribs 130 are arranged on the other one of the lens tube 200 and the lens head 100, the limit ribs 130 and the limit grooves 230 extend in the first direction, and the limit ribs 130 are fit into the limit grooves 230. In this way, the lens tube 200 is prevented from rotating and deflecting with respect to the lens head 100 and only allowed to reciprocate linearly with respect to the lens head 100 in the first direction, thus improving the focusing accuracy.

The rotating assembly may be rotatably mounted in various ways. In some embodiments, the lens tube 200 is disposed around the lens head 100, and a mounting groove 210 is formed in the wall of the lens tube 200; the rotating assembly comprises a driving gear 310 and a driven gear assembly meshing with the driving gear 310, the driving gear 310 and the driven gear assembly are mounted in the mounting groove 210 and are able to rotate in the mounting groove 210, the driving gear 310 is connected to the outside of the lens tube 200, the push component 400 is arranged on the driven gear assembly, and at least part of the push component 400 is located outside the mounting groove 210 and the push component 400 extends into the sliding groove 120. The driven gear assembly may be a gear or formed by two or more gears. In some embodiments, the driven gear assembly comprises a transmission gear 320 and a driven gear 330, wherein the transmission gear 320 meshes with the driving gear 310 and the driven gear 330, and the push component 400 is arranged on the driven gear 330. When focus adjustment is needed, the driving gear 310 is rotated to drive the transmission gear 320 to rotate, the transmission gear 320 drives the driven gear 330 to rotate, and the driven gear 330 drives the push component 400 to rotate. In the rotation process, the push component 400 presses the wall of the sliding groove 120 to push the lens tube 200 to slide in the first direction to adjust the focus. In this embodiment, because the motion transmission reliability of gear transmission is high, the reliability of the light adjustment device is improved; because the rotating assembly is formed by multiple gears, the focusing accuracy can be improved by adjusting the transmission ratio.

The rotating assembly may be specifically configured in various ways, and two examples are described below.

Referring to FIGS. 1-4, in a first embodiment, the driven gear 330 comprises internal teeth, a receiving area is defined and enclosed by the internal teeth, the driving gear 310 and the transmission gear 320 are located in the receiving area, the driving gear 310 meshes with the transmission gear 320 by means of external teeth, and the transmission gear 320 meshes with the internal teeth of the driven gear 330. In this embodiment, the driving gear 310, the transmission gear 320 and the driven gear 330 are arranged close to each other to improve the structural compactness of the light adjustment device, thus reducing the size of the light adjustment device.

Further, a limit through-hole 220 is formed in a bottom of the mounting groove 210 and penetrates through the wall of the lens tube 200; the driven gear 330 is mounted at the bottom of the mounting groove 210 and is able to rotate around an axial direction of the mounting groove 210. A limit protrusion 331 is protrusively arranged at the bottom of the driven gear 330 and inserted into the limit through-hole 220, and the push component 400 protrudes beyond the limit protrusion 331 and penetrates through the limit through-hole 220 to stretch into the sliding groove 120. The driving gear 310 and the transmission gear 320 are located on a side, facing away from the limit protrusion 331, of the driven gear 330. In this embodiment, the driven gear 330 is supported at the bottom of the mounting groove 210, and the limit protrusion 331 is inserted into the limit through-hole 220 to fulfil a limit effect on the driven gear 330, such that the driven gear 330 will not deflect in the rotation process, thus improving the focusing accuracy. Similarly, a first limit projection 335 may be further protrusively arranged on the driven gear 330, and the driving gear 310 is disposed around the first limit projection 335 so that the driving gear 310 is prevented from deflecting in the rotation process. A second limit projection may be further protrusively arranged on the driven gear 330 or other components to limit the transmission gear 320 so as to prevent the transmission gear 320 from deflecting in the rotation process, thereby improving the focusing accuracy.

Referring to FIGS. 5-9, in a second embodiment, the mounting groove 210 comprises a first groove section 211, a second groove section 212 and a third groove section 213 which are sequentially arranged in the circumferential direction of the lens tube 200, wherein the second groove section 212 is connected to the first groove section 211 and the third groove section 213, the driving gear 310 is rotatably mounted in the first groove section 211, the transmission gear 320 is rotatably mounted in the second groove section, and the driven gear 330 is rotatably mounted in the third groove section. In this way, an external force applied to the lens tube 200 is decentralized. In actual application, the light adjustment device may comprise two second groove sections 212 and two third groove sections 213, wherein the two second groove sections 212 are located on two sides of the first groove section 211 respectively, and each of the two second groove sections 212 is provided therein with the transmission gear 320; the two third groove sections 213 are located on the two sides of the first groove section 211 respectively, each of the two third groove sections 213 is provided therein with the driven gear 320, each of the two driven gears 330 is provided thereon with the push component 400, and the lens head 100 is provided with the sliding groove 120 at a location corresponding to each of the two push components 400. In this way, the two push components 400 push the lens head 100 from two sides to make sure that the two sides of the lens head 100 are uniformly forced when the lens head 100 telescopes, such that the lens head 100 can slide smoothly and stably, thus improving the stability and reliability of the light adjustment device.

Further, a first limit through-hole 221 is formed in the bottom of the first groove section 211, a first limit protrusion 332 protrudes from the bottom of the driving gear 310, and the first limit protrusion 332 is inserted into the first limit through-hole 221; and/or, a second limit through-hole 222 is formed in the bottom of the second groove section 212, a second limit protrusion 333 protrudes from the bottom of the transmission gear 320, and the second limit protrusion 333 is inserted into the second limit through-hole 222; and/or, a third limit through-hole 223 is formed in the bottom of the third groove section 213 and penetrates through the wall of the lens tube 200, a third limit protrusion 334 protrudes from the bottom of the driven gear 330, and the third limit protrusion 334 is inserted into the third limit through-hole 223; the push component 400 extends beyond the third limit protrusion 334 and penetrates through the third limit through-hole 223 to stretch into the sliding groove 120. In this embodiment, the gears are supported at the bottoms of the groove sections, and the limit protrusions are inserted into the limit through-holes, such that the gears are limited and will not deflect during rotation, thus improving the focusing accuracy of the light adjustment device.

To facilitate operation, in some embodiments, the rotating assembly further comprises a rotary knob 340, at least a portion of the rotary knob 340 sticks out of a surface of the lens tube 200, and the rotary knob 340 is connected to the driving gear 310, such that the driving gear 310 will rotate synchronously when the rotary knob 340 is rotated. That is, the driving gear 310 can be rotated by rotating the rotary knob 340 to adjust the focus. At least a portion of the rotary knob 340 protrudes beyond the surface of the lens tube 200, such that users can rotate the rotary knob 340 easily, and adjustment of focus can be performed more conveniently.

In some embodiments, the light adjustment device further comprises a cover plate 500, the cover plate 500 covers an opening of the mounting groove 210, and a through-hole 501 is formed in a position, corresponding to the driving gear 310, of the cover plate 500 to expose the driving gear 310. The cover plate 500 not only can improve the aesthetics, but also can fulfil a shelter effect to prevent the rotating assembly from becoming disengaged from the opening of the mounting groove 210 during rotation, thus ensuring structural stability. In the second embodiment, the cover plate may comprise a first cover body 510, a second cover body 520 and a third cover body 530, the first cover body 510 covering the first groove section 211, the second cover body 520 covering the second groove section 212, and the third cover body 530 covering the third groove section 213.

In conjunction with the embodiment having the transmission gear 320, a second limit projection 502 may be arranged on a side, facing the transmission gear 320, of the cover plate 500, and the transmission gear 320 is disposed around the second limit projection 502, so that the transmission gear 320 is prevented from deflecting during rotation, thus improving the focusing accuracy.

Referring to FIG. 10 to FIG. 14, in another embodiment, the lens tube 200 and the lens head 100 are relatively fixed in a circumferential direction such that the lens tube 200 and the lens head 100 cannot rotate relative to each other, and are movably fitted in the first direction such that the lens tube 200 and the lens head 100 are capable of relative movement in the first direction.

The transmission structure of this embodiment includes a first transmission member 610 and a second transmission member 620 that are threadedly engaged with each other. The first transmission member 610 rotates following the rotation of the rotating assembly, and the second transmission member 620 is fixed relative to the other of the lens tube 200 and the lens head 100 (i.e., the one not provided with the rotating assembly). The second transmission member 620 is fixed relative to the other one of the lens tube 200 and the lens head 100, and the lens head 100 and the lens tube 200 cannot rotate relative to each other, and therefore the second transmission member 620 cannot be rotated by the first transmission member 610. As a result, when the first transmission member 610 rotates under the action of the rotating assembly, the second transmission member 620 makes a straight line movement in the first direction under the drive of the first transmission member 610, which in turn drives the other one of the lens tube 200 and the lens head 100 fixed therewith to make a synchronized linear movement, realizing that the lens tube 200 moves linearly in the first direction relative to the lens head 100.

In an optional example, the lens tube 200 is sleeved around an outer side of the lens head 100. The first transmission member 610 and the rotating assembly are rotationally mounted to the lens tube 200 respectively, the first transmission member 610 is disposed on an inner side of the lens tube 200 and sleeved around the outer side of the lens head 100, and the rotating assembly is partially disposed on the outer side of the lens tube 200 for user operation. The second transmission member 620 is fixed relative to the lens head 100, and the second transmission member 620 is disposed on an inner side of the first transmission member 610 and threadedly engaged with the first transmission member 610. The rotating assembly drives the first transmission member 610 to rotate within the lens tube 200, and the second transmission member 620 is driven by the first transmission member 610 to perform a linear movement, which in turn drives the lens head 100 to perform a linear movement relative to the lens tube 200.

The first transmission member 610 is provided with a helical groove 612 on the inner side, and the second transmission member 620 is provided with helical tooth 622 on the outer side, the helical tooth 622 protruding beyond the circumferential outer surface of the lens head 100, and the helical tooth 622 and the helical groove 612 engage with each other, so as to form a threaded fit between the first transmission member 610 and the second transmission member 620.

There can be a plurality of the second transmission members 620, and each second transmission member 620 is provided with helical tooth 622 on the outer side thereof, and the helical tooth 622 of each second transmission member 620 engage with the helical grooves 612 on the first transmission member 610, so as to form a threaded fit with the first transmission member 610, and to enhance the stability of the threaded fit between the first transmission member 610 and the second transmission member 620. In the illustrated embodiment, the number of the second transmission members 620 is eight, and the eight second transmission members 620 are evenly spaced along the circumferential direction of the lens head 100. It is noted, however, that there can be provided with a suitable number of the second transmission members 620.

The lens head 100 is provided with a mounting slot 140, and the second transmission member 620 is fixedly mounted to the mounting slot 140 to enhance the compactness of the structure between the lens head 100 and the second transmission members 620, and to reduce the space occupied by the lens head 100 and the transmission members 620 within the lens tube 200.

In an optional example, the second transmission member 620 is secured to the mounting slot 140 of the lens head 100 by a fastener such as, for example, a bolt.

A positioning pin 142 is provided in the mounting slot 140, and a positioning hole 624 is provided on the second transmission member 620, and the positioning pin 142 is inserted into the positioning hole 624. When the second transmission member 620 is placed in the mounting slot 140, the second transmission member 620 can be positioned by inserting the positioning pin 142 into the positioning hole 624, so as to quickly locate the correct installation position of the second transmission member 620, and after the positioning pin 142 is inserted into the positioning hole 624, it can also form a limiting effect on the second transmission member 620 to avoid shaking of the second transmission member 620 in the process of fixing the second transmission member 620.

The number of mounting slots 140 is the same as the number of the second transmission members 620 and they correspond to each other, and each second transmission member 620 is installed into one corresponding mounting slot 140.

Optionally, each of the mounting slots 140 is provided with a plurality of positioning pins 142, for example, two positioning pins 142, spaced apart from each other. The second transmission member 620 is correspondingly provided with a plurality of positioning holes 624, and each of the positioning pins 142 is inserted into one of the corresponding positioning holes 624, so as to enhance the positioning effect.

The mounting slots 140 are disposed at one end of the lens head 100 in the first direction, the positioning pins 142 extend in the first direction, and the second transmission members 620 can be installed into the mounting slots 140 in the first direction.

The second transmission member 620 is disposed at one end of the lens head 100 in the first direction, and in the first direction, one end of the helical groove 612 extends to an end face of the first transmission member 610 to form an opening 614 at the end face, and the helical tooth 622 on the second transmission member 620 may enter the helical groove 612 through the opening 614. During assembly, the second transmission member 620 can be fixed to the lens head 100 first, and then the first transmission member 610 can be sleeved around the outer side of the lens head 100 in a first direction, and the helical tooth 622 can be caused to enter the opening 614 by rotating the lens head 100 or the first transmission member 610, so as to form a threaded fit between the first transmission member 610 and the second transmission member 620, reducing the assembly difficulty.

In an embodiment, the rotating assembly includes a first gear 350, a second gear 616 is provided correspondingly on the outer side of the first transmission member 610, and the first gear 350 and the second gear 616 engage with each other so that the first transmission member 610 rotates following the rotation of the rotating assembly. In the illustrated embodiment, the axis of rotation of the first gear 350 and the axis of rotation of the second gear 616 are perpendicular to each other. The axis of rotation of the second gear 616 is along the first direction, and the axis of rotation of the first gear 350 is perpendicular to the first direction, so that the rotating assembly can be mounted on the circumferentially outer side of the lens tube 200 perpendicular to the first direction to facilitate the user's operation.

The first gear 350 and the second gear 616 may be separate gears respectively mounted on the rotating assembly and the first transmission member 610, or alternatively they may be integrally formed with the rotating assembly and the first transmission member 610. In an optional example, the rotating assembly includes a knob 340, and the first gear 350 is fixed relative to the knob 340, so that when the knob 340 rotates, the first gear 350 can be rotated together with the knob 340. The knob 340 is rotationally mounted to and disposed on the outer side of the lens tube 200, and a user can turn the knob 340 to drive the first gear 350 to rotate.

The first transmission member 610 is generally in the form of a cylinder, including a cylindrical body 630. The second gear 616 is disposed around a circumferential outer side of the cylindrical body 630. In the illustrated embodiment, an annular flange 618 protrudes radially from and is fixed on the outer side of the cylindrical body 630, and the second gear 616 is formed on a side of the flange 618 facing the first gear 350. The first transmission member 610 may be integrally formed into one piece, or alternatively the flange 618 may be separately formed and then mounted to the cylindrical body 630. In addition, the second gear 616 may be integrally formed with the annular flange 616, or it may be separately formed and then mounted to the annular flange 616.

In an embodiment, the outer side of the lens head 100 is provided with a recess 150 that extends in the first direction, and the inner side of the lens tube 200 is correspondingly provided with a bump 240 that can be movably inserted into the recess 150 in the first direction, and the bump 240 can restrict the rotation of the lens tube 200 with respect to the lens head 100, so that the lens head 100 and the lens tube 200 can form a movable fit in the first direction and are relatively fixed in the circumferential direction. The bump 240 is disposed on an outside of the first transmission member 610 in the first direction to prevent the bump 240 from affecting the rotation of the first transmission member 610.

Optionally, there can be a number of the bumps 240 and the recesses 150, and each of the bumps 240 is inserted into a corresponding one of the recesses 150 to enhance the limiting effect. In the illustrated embodiment, there are four bumps 240 and four recesses 150. It should be noted that other number of the bumps 240 and recesses 150 is also possible.

A stopper 160 is provided in the recess 150, aligning with the bump 240 in the first direction. During the movement of the lens head 100 in the first direction away from the lens tube 200, the lens head 100 brings the stopper 160 to move in the direction of the bump 240. When the stopper 160 and the bump 240 resist each other, the stopper 160 is stopped by the bump 240 from further moving in the first direction, so that the lens head 100 cannot continue to move away from the lens tube in the first direction, thus limiting the movement distance of the lens head 100, avoiding the risk that the first transmission member 610 and the second transmission member 620 becomes disengaged from the threaded fit or even the lens head 100 falls off the lens tube 200 due to an overlarge movement distance of the lens head 100.

The number of the stopper 160 may be one, i.e., only one of the recesses 150 is provided with the stopper 160. Alternatively, there can be more stoppers 160, with one stopper 160 being provided in each of the recesses 150.

Figure 15:
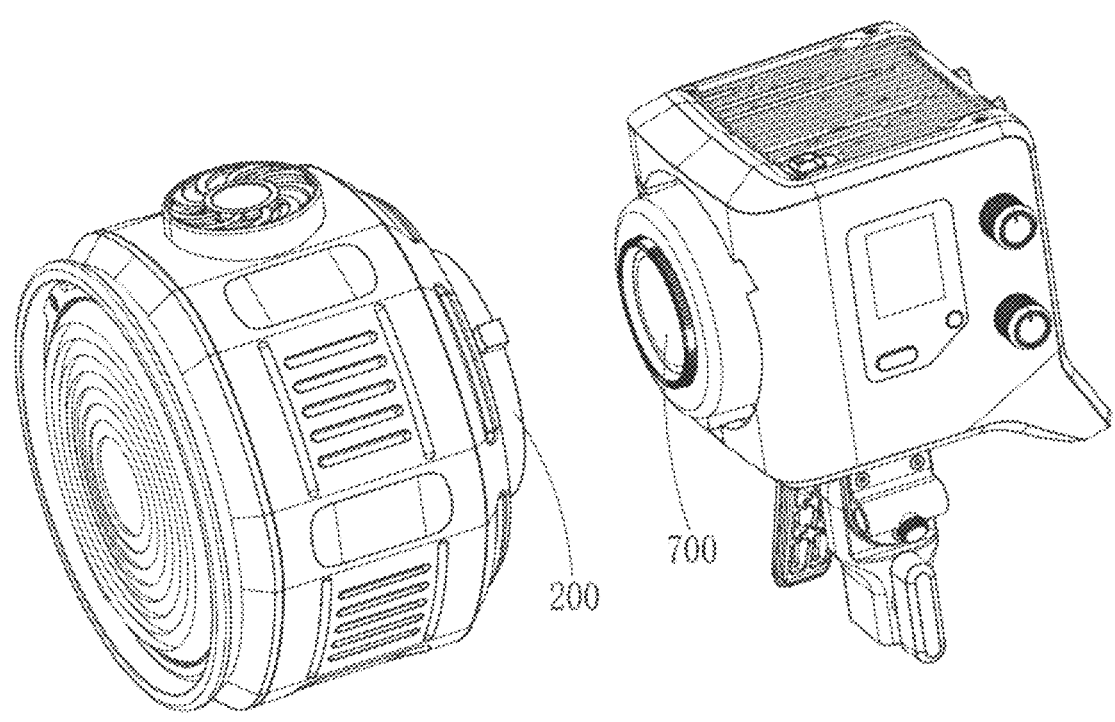
FIG. 15 is an exploded view showing one embodiment of a photography auxiliary device.

Referring to FIG. 15, the disclosure further provides a photography auxiliary device, comprising a light source 700 and a light adjustment device, wherein the light source 700 is arranged in a lens tube of the light adjustment device. The light adjustment device can be constructed in the same way as described in the above embodiments. The photography auxiliary device adopts all the technical solutions in all the above embodiments and therefore at least has all the beneficial effects fulfilled by the technical solutions in the above embodiments, which will not be repeated here.

The above embodiments are merely preferred ones of the invention and are not intended to limit the patent scope of the invention. Based on the concept of the disclosure, all equivalent structural transformations made according to the description and drawings, or direct/indirection applications in other related fields should fall within the patent protection scope of the invention.

What is claimed is:

1. A light adjustment device comprising:
   a lens head and a lens tube, wherein the lens head is configured to mount a lens, one of the lens tube and the lens head are disposed with one sleeving is sleeved around the other of the lens tube and the lens head, and the lens tube is slidable with respect to the lens head in a first direction;
   wherein a rotating assembly is rotatably mounted on one of the lens tube and the lens head, the rotating assembly is drivingly connected with the other of the lens tube and the lens head through a transmission structure, at least a portion of the transmission structure is rotatable with the rotation of the rotating assembly, the transmission structure is configured to convert a rotational output of the rotating assembly into a linear output of the other of the lens tube and the lens head, so that the lens tube is capable of reciprocating linearly in the first direction relative to the lens head under the action of the linear output;
   wherein the transmission structure comprises a push component and a sliding groove corresponding to the push component, the push component is arranged on the rotating assembly and rotatable with rotation of the rotating assembly, the sliding groove corresponding to the push component is formed in the other one of the lens tube and the lens head, an included angle is formed between an extension direction of the sliding groove and the first direction, and the push component extends into the sliding groove, such that when the rotating assembly rotates, the push component rotates synchronously to press a wall of the sliding groove to enable the lens tube to reciprocate linearly with respect to the lens head in the first direction.

2. The light adjustment device according to claim 1, wherein the lens tube is disposed around the lens head, and a mounting groove is formed in a wall of the lens tube;
   wherein the rotating assembly comprises a driving gear and a driven gear assembly meshing with the driving gear, the driving gear and the driven gear assembly are mounted in the mounting groove and are rotatable in the mounting groove, the driving gear is connected to an outside of the lens tube, the push component is arranged on the driven gear assembly, and at least a portion of the push component is located outside the mounting groove and extends into the sliding groove.

3. The light adjustment device according to claim 2, wherein the driven gear assembly comprises a transmission gear and a driven gear, the transmission gear meshes with the driving gear and the driven gear, and the push component is arranged on the driven gear.

4. The light adjustment device according to claim 3, wherein the driven gear comprises internal teeth, a receiving area is defined and enclosed by the internal teeth, the driving gear and the transmission gear are located in the receiving area, the driving gear meshes with the transmission gear by mean of external teeth, and the transmission gear meshes with the internal teeth of the driven gear.

5. The light adjustment device according to claim 4, wherein a limit through-hole is formed in a bottom of the mounting groove and extends through the wall of the lens tube;

wherein the driven gear is mounted at the bottom of the mounting groove and is rotatable around an axial direction of the mounting groove, a limit protrusion is arranged at a bottom of the driven gear and inserted into the limit through-hole, and the push component extends beyond the limit protrusion and extends through the limit through-hole into the sliding groove; the driving gear and the transmission gear are located on a side, facing away from the limit protrusion, of the driven gear.

6. The light adjustment device according to claim 3, wherein the mounting groove comprises a first groove section, a second groove section and a third groove section which are sequentially arranged in a circumferential direction of the lens tube, and the second groove section is connected to the first groove section and the third groove section;

wherein the driving gear is rotatably mounted in the first groove section, the transmission gear is rotatably mounted in the second groove section, and the driven gear is rotatably mounted in the third groove section.

7. The light adjustment device according to claim 6, wherein the light adjustment device comprises two such second groove sections and two such third groove sections, the two second groove sections are located on two sides of the first groove section respectively, each of the two second groove sections is provided with the transmission gear, the two third groove sections are located on the two sides of the first groove section respectively, each of the two third groove sections is provided therein with the driven gear, each of the two driven gears is provided thereon with the push component, and the lens head is provided with the sliding groove at a location corresponding to each of the two push components.

8. The light adjustment device according to claim 2, wherein the rotating assembly further comprises a rotary knob, at least a portion of the rotary knob protrudes beyond a surface of the lens tube, and the rotary knob is connected to the driving gear, such that the driving gear rotates synchronously when the rotary knob is rotated; and/or, the light adjustment device further comprises a cover plate, the cover plate covers an opening of the mounting groove, and a through-hole is formed in a position, corresponding to the driving gear, of the cover plate to expose the driving gear.

9. The light adjustment device according to claim 1, wherein a limit groove is formed in one of the lens tube and the lens head, a limit rib is arranged on the other one of the lens tube and the lens head, the limit rib and the limit groove extend in the first direction, and the limit rib is fit into the limit groove.

10. A light adjustment device comprising:

a lens head and a lens tube, wherein the lens head is configured to mount a lens, one of the lens tube and the lens head are disposed with one sleeving is sleeved around the other of the lens tube and the lens head, and the lens tube is slidable with respect to the lens head in a first direction;

wherein a rotating assembly is rotatably mounted on one of the lens tube and the lens head, the rotating assembly is drivingly connected with the other of the lens tube and the lens head through a transmission structure, at least a portion of the transmission structure is rotatable with the rotation of the rotating assembly, the transmission structure is configured to convert a rotational output of the rotating assembly into a linear output of the other of the lens tube and the lens head, so that the lens tube is capable of reciprocating linearly in the first direction relative to the lens head under the action of the linear output; and wherein the lens tube and the lens head are relatively fixed in a circumferential direction, the transmission structure comprises a first transmission member and a second transmission member threadedly engaged with each other, the first transmission member is configured to rotate following the rotation of the rotating assembly, and the second transmission member is relatively fixed to the other of the lens tube and the lens head.

11. The light adjustment device according to claim 10, wherein the lens tube is attached around the lens head, the rotating assembly and the first transmission member are rotationally mounted on the lens tube respectively, the first transmission member is attached around the lens head, the first transmission member is provided with a helical groove on an inner side of the first transmission member, and the second transmission member is fixed relative to the lens head and is provided with a helical tooth protruding from an outer side of the second transmission member, and the helical tooth and the helical groove engage with each other to form a threaded fit between the first transmission member and the second transmission member.

12. The light adjusting device according to claim 11, wherein there are a plurality of the second transmission members, each of the second transmission members being provided with the helical tooth and respectively engaging with the helical groove, and the plurality of the second transmission members being spaced apart and arranged in a circumferential direction of the lens head.

13. The light adjustment device according to claim 11, wherein the lens head is provided with a mounting slot, and the second transmission member is fixedly mounted in the mounting slot.

14. The light adjusting device according to claim 13, wherein the mounting slot is provided with a positioning pin, the second transmission member is provided with a positioning hole, and the positioning pin is inserted into the positioning hole.

15. The light adjustment device according to claim 11, wherein the second transmission member is mounted on one end of the lens head in the first direction, and in the first direction, one end of the helical groove extends to an end face of the first transmission member to form an opening, for the helical tooth on the second transmission member to enter the helical groove through the opening.

16. The light adjustment device according to claim 11, wherein the rotating assembly is provided with a first gear, the first transmission member is provided with a second gear on an outer side of the first transmission member, the first gear and the second gear engage with each other, and an axis of rotation of the first gear being perpendicular to an axis of rotation of the second gear.

17. The light adjustment device according to claim 16, wherein the first transmission member comprises a cylindrical body, and the second gear is attached around a circumferential outer side of the cylindrical body.

18. The light adjustment device according to claim 17, wherein an annular flange is provided around the outer side of the cylindrical body, and the second gear is provided on a side of the annular flange facing the first gear.

19. A photography auxiliary device, comprising a light source and a light adjustment device which comprises a lens head and a lens tube;

wherein the lens head is configured to mount a lens, one of the lens tube and the lens head are disposed with one sleeving is sleeved around the other of the lens tube and the lens head, and the lens tube is slidable with respect to the lens head in a first direction;

wherein a rotating assembly is rotatably mounted on one of the lens tube and the lens head, the rotating assembly is drivingly connected with the other of the lens tube and the lens head through a transmission structure, at least a portion of the transmission structure is rotatable with the rotation of the rotating assembly, the transmission structure is configured to convert a rotational output of the rotating assembly into a linear output of the other of the lens tube and the lens head, so that the lens tube is capable of reciprocating linearly in the first direction relative to the lens head under the action of the linear output; and wherein the light source is arranged in the lens tube of the light adjustment device.

\* \* \* \* \*